United States Patent
Benton et al.

(10) Patent No.: US 12,282,137 B2
(45) Date of Patent: Apr. 22, 2025

(54) LIGHT SOURCE FOR AN OPTICAL SENSOR

(71) Applicant: TE Connectivity Services GmbH, Schaffhausen (CH)

(72) Inventors: Mark Benton, Hoffman Estates, IL (US); Soren Grinderslev, Hummelstown, PA (US); William Atley Weeks, Ivyland, PA (US); Todd Jason Kuvshinikov, Etters, PA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 17/133,263

(22) Filed: Dec. 23, 2020

(65) Prior Publication Data

US 2022/0196875 A1   Jun. 23, 2022

(51) Int. Cl.
  *G01V 8/24*     (2006.01)
  *G01F 23/292*   (2006.01)
  *G02B 6/00*     (2006.01)
  *G02B 27/14*    (2006.01)

(52) U.S. Cl.
  CPC .............. *G01V 8/24* (2013.01); *G01F 23/292* (2013.01); *G02B 6/00* (2013.01); *G02B 27/144* (2013.01)

(58) Field of Classification Search
  CPC ........ G02B 27/144; G02B 27/14; G02B 6/00; G01F 23/292; G01F 23/284; G01V 8/24
  See application file for complete search history.

(56) References Cited

U.S. PATENT DOCUMENTS

| 5,311,013 A | 5/1994 | Gutcheck et al. |
| 5,401,959 A | 3/1995 | Bercan |
| 5,631,987 A | 5/1997 | Laskey et al. |

(Continued)

FOREIGN PATENT DOCUMENTS

| CN | 202160311 U | * | 3/2012 |
| CN | 114878141 B | * | 8/2023 |

(Continued)

OTHER PUBLICATIONS

Peiner, et al, "Microelectromechanical Vibration Sensor XP-000766589 with Optical Interconnects", Journal of Microelectromechanical Systems, IEEE Service Center, pp. 56-60, vol. 7, No. 1, Mar. 1, 1998, United States.

(Continued)

*Primary Examiner* — Marin Pichler
*Assistant Examiner* — Mary A El-Shammaa

(57) ABSTRACT

An optical sensor system comprising: (a) a light source for at least one optical sensor, the light source comprising at least, (i) an interposer having first and second opposing sides and defining at least one alignment aperture extending from the first opposing side to the second opposing side; (ii) at least one fiber disposed in the at least one alignment aperture, the at least one fiber having a first optical axis; (iii) at least one light emitting component mounted to the second opposing side and having a second optical axis coincident with the first optical axis, the light emitting component configured to emit light, at least a portion of which is coupled with the at least one fiber as coupled light; and (b) the at least one optical sensor optically coupled to the at least one fiber.

20 Claims, 4 Drawing Sheets

(56) References Cited

U.S. PATENT DOCUMENTS

| | | | | |
|---|---|---|---|---|
| 6,167,169 | A * | 12/2000 | Brinkman | G02F 1/011 385/16 |
| 11,252,385 | B2 * | 2/2022 | Melville | H04N 9/3135 |
| 2004/0019283 | A1 * | 1/2004 | Lambert | A61B 5/14532 600/476 |
| 2004/0127778 | A1 * | 7/2004 | Lambert | G01N 21/65 600/318 |
| 2006/0217793 | A1 | 9/2006 | Costello | |
| 2012/0206050 | A1 * | 8/2012 | Spero | H05B 45/395 315/152 |
| 2014/0097459 | A1 | 4/2014 | Mothohara | |
| 2014/0217448 | A1 * | 8/2014 | Kim | H01L 33/405 257/98 |
| 2016/0246049 | A1 | 8/2016 | Sakai et al. | |
| 2017/0239892 | A1 * | 8/2017 | Buller | B23K 15/02 |
| 2019/0098723 | A1 * | 3/2019 | Sadwick | F21K 9/272 |
| 2020/0400901 | A1 | 12/2020 | Dorrestein et al. | |
| 2021/0116656 | A1 | 4/2021 | Tuin et al. | |
| 2021/0405501 | A1 * | 12/2021 | Rollins | H01S 3/0092 |

FOREIGN PATENT DOCUMENTS

| | | | | |
|---|---|---|---|---|
| JP | 2009 047937 A | | 3/2009 | |
| WO | WO-9906760 A1 * | | 2/1999 | B60Q 1/0011 |
| WO | WO-2006054117 A2 * | | 5/2006 | G01F 23/292 |
| WO | WO-2008034225 A1 * | | 3/2008 | G01D 5/35303 |
| WO | WO-2010056375 A1 * | | 5/2010 | F41H 13/00 |

OTHER PUBLICATIONS

European Search Report, Mail Date Apr. 28, 2022, EP 21 21 6521, International Application No. 21216521.1-1020.

European Office Action, European App. No 21216521.1 International Filing Date Sep. 4, 2024.

* cited by examiner

LIGHT SOURCE FOR AN OPTICAL SENSOR

FIELD OF DISCLOSURE

This disclosure relates generally to an optical sensor, and, more specifically, to a light source for an optical sensor having high coupling efficiency.

BACKGROUND

Optical sensor systems use various forms of light to detect/quantify matter for various applications. An optical sensor system comprises a light source that generates light, and a sensor for detecting and quantifying changes in the light as a result of the light's interaction with the targeted matter.

Of particular interest herein is the use of optical sensors in avionics. Optical sensors are particularly well-suited for aircraft for a number of reasons. For example, because light is used rather than electricity, there is no chance of spark, which is critical when measuring properties of volatile materials, such as, for example, jet fuel levels. Additionally, optical signals present no issue with respect to electromagnetic interference (EMI). Again, this is critical in aircraft applications where electronic and electro-mechanical systems are in close proximity to one another, and minimizing EMI among these various systems is critical for the safe operation of the aircraft. And finally, fiber optic systems have considerably less weight than their copper alternatives. Minimizing weight is also a critical factor in aircraft design.

Although optical sensors are well suited for aircraft applications, Applicant has identified a number of shortcomings in conventional light sources for optical sensors. The main problem is that the coupling efficiency between the light-emitting component and the optical fiber to which the sensor is connected tends to be low and introduces considerable losses in the system. Coupling the light-emitting component to the fiber requires precisely aligning the core of the fiber with the output spot of the light-emitting component. Any misalignment between the spot and the core results in significant loss. Currently lasers are typically used as the light-emitting component because of their relatively small spot size, which makes optical alignment with the fiber easier. Although light emitting diodes (LEDs) offer certain advantages over lasers, their high emission angle results in a relatively large spot size, which, as a practical matter, tends to be too large to be optically coupled with a fiber.

These coupling inefficiencies result in a light source that is typically suited for supplying light to just one optical sensor. (Although it is possible to drive the light-emitting component at higher current to increase output, doing so shortens the longevity of the component, which is already an issue as discussed below.) Applicant recognizes that if more powerful light sources were available, a single light source could supply light to multiple sensors, thus reducing the number of light sources needed in an aircraft, which in turn would reduce not only the cost, but also the weight of the avionics.

Another problem with conventional light sources is that lasers tend to have a relatively short life compared to other solid-state light-emitting components such as LEDs. The use of lasers as a light source for sensors was driven in large part by their use as light sources in telecommunications. However, in telecommunications, a laser's fast response time and its coherent light emission were the paramount considerations--more important than longevity. Applicant recognizes, however, that light for optical sensors need not be coherent light, nor is it modulated in any way to communicate data. Applicant recognizes that a light source for an optical sensor, particularly one used in aircraft, should prioritize durability/longevity over switching speed/coherence. Although LEDs would be preferred from durability/longevity standpoint, their optical coupling inefficiencies, as discussed above, prevent, as a practical matter, their implementation as a light source for optical sensors.

Yet another problem with conventional light sources is the proprietary nature of their packaging. Light sources for optical sensors tend to have proprietary designs with unique packaging. These customized packages have variation in their output, and the designs change frequently so that the probability of obtaining one of these unique packages 5 or 10 years into the future is remote. Thus, these proprietary light source designs are often obsolete after just a few years. However, aircraft tend to have a serviceable life span of decades to make them economically viable. Thus, the components used in aircraft must be obtainable and replaceable many years after the initial installation. The obsolescence of these proprietary light sources creates a supply-chain issue in connection with maintaining aircraft. Applicant recognizes that, rather than providing light sources in proprietary packaging, they should be assembled from readily-available, standard components, which can be obtained years into the future.

Therefore, applicant has identified the need for a light source that (1) has improved optical coupling to operate one or more optical sensors, (2) has improved longevity, and/or (3) is assembled from readily-available, standardized components. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant recognizes that the coupling inefficiency between the light emitter and the optical fiber in a conventional light source for optical sensors prevents the optimization of the light source. By increasing the coupling efficiency between the light-emitting component and the fiber, the light source can be optimized for power, longevity, and replacement parts sustainability. To this end, Applicant recognizes that the optical interposer described in U.S. application Ser. No. 16/450,189, filed Jun. 24, 2019, which is hereby incorporated by reference in its entirety, is particularly well suited in optical sensor light source applications. Accordingly, the enhanced optical coupling efficiencies provided by this interposer, allows for lower drive current for the same optical output power of the coupled fiber, thus improving device lifetime and reliability. Additionally, this enhanced coupling makes it more efficient to power multiple sensors with a single device, without exceeding the maximum allowable drive currents. The interposer configuration also enhances the ability to maintain constant optical source power over varying batches of devices, as much of the variability is eliminated by the limited optical coupling point in the device. Finally, the interposer configuration in one embodiment also facilitates the use of standard, off-the-shelf components, which will be available well into the future, thus minimizing supply chain issues.

In one embodiment, the present invention relates to an optical sensor system comprising: (a) a light source for at least one optical sensor, the light source comprising at least, (i) an interposer having first and second opposing sides and defining at least one alignment aperture extending from the first opposing side to the second opposing side; (ii) at least one fiber disposed in the at least one alignment aperture, the at least one fiber having a first optical axis; (iii) at least one light emitting component mounted to the second opposing side and having a second optical axis coincident with the first optical axis, the light emitting component configured to emit light, at least a portion of which is coupled with the at least one fiber as coupled light; and (b) the at least one optical sensor optically coupled to the at least one fiber.

In another embodiment, the present invention relates to a light source for supplying light to an optical sensor, the light source comprising: (a) an interposer having first and second opposing sides and defining at least one alignment aperture extending from the first opposing side to the second opposing side; (b) at least one fiber disposed in the at least one alignment aperture, the at least one fiber having a first optical axis; (c) at least one light emitting component mounted to the second opposing side and having a second optical axis coincident with the first optical axis, the light emitting component configured to emit light, at least a portion of which is coupled with the at least one fiber as coupled light; and (d) at least one splitter configured at least for coupling a portion of the coupled light to a feedback component configured for controlling output of the light emitting component, and for supplying at least a portion of the remaining light to the at least one optical sensor.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
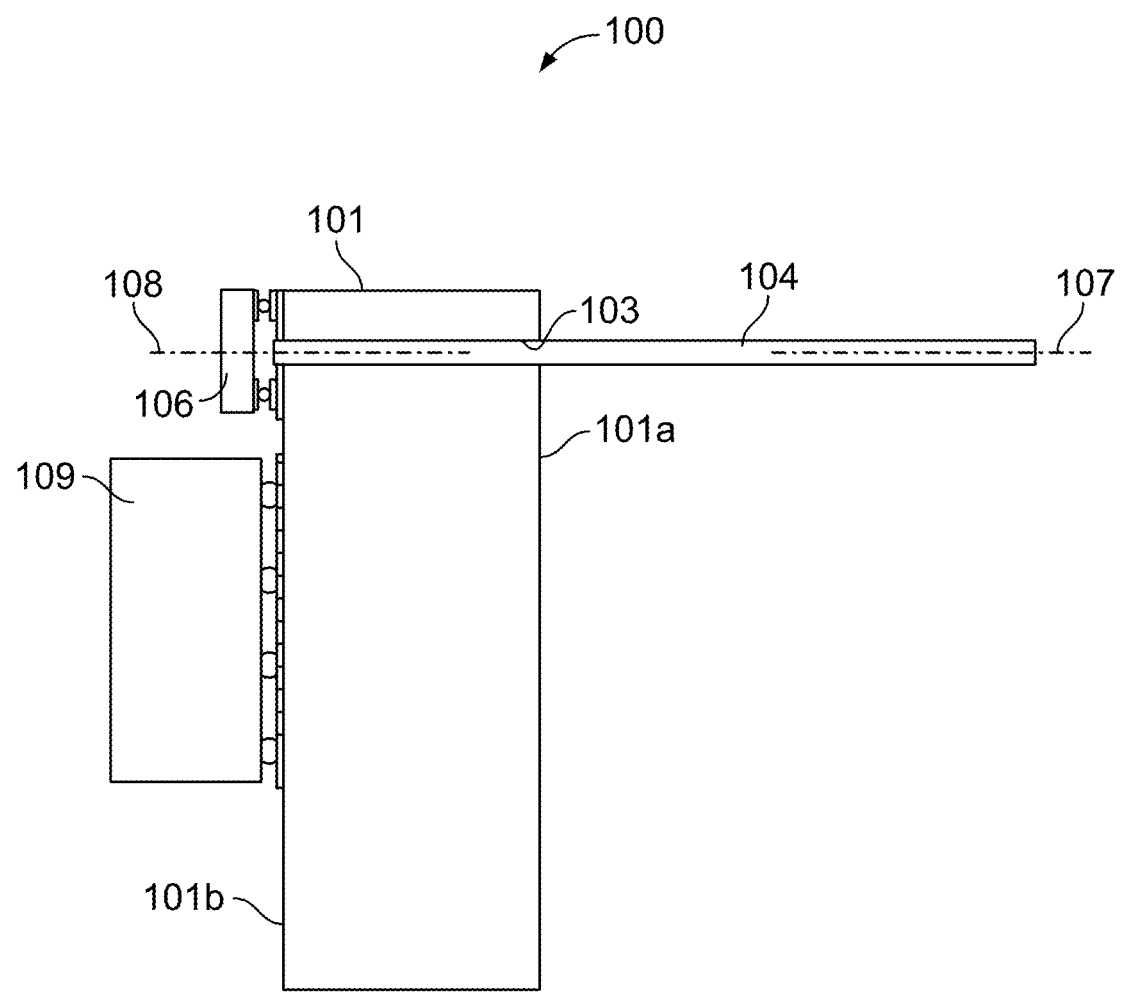
FIG. 1 shows one embodiment of an optical subassembly comprising an interposer for achieving low loss coupling between a light-emitting component and a fiber.
Figure 2:
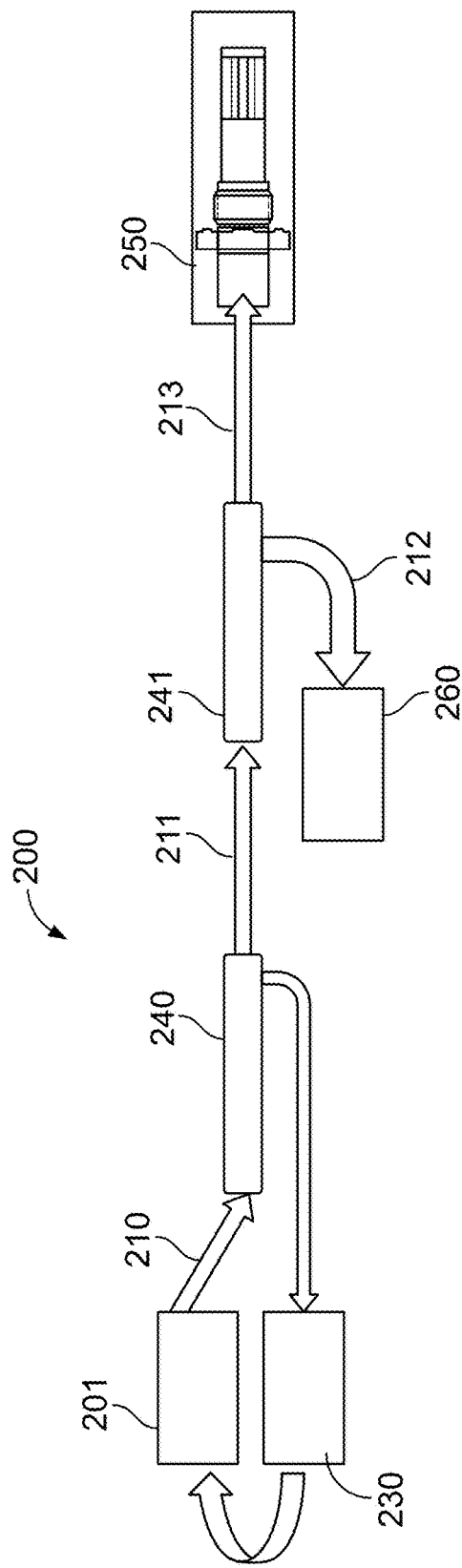
FIG. 2 shows one embodiment of a light source for an optical sensor.

Referring to FIGS. 1 and 2, one embodiment of a light source 200 of the present invention is shown. This light source 200 is configured to supply light to at least one optical sensor 250. The light source 200 comprises an optical subassembly (OSA) 201, one embodiment of which is shown in FIG. 1. Referring to FIG. 1, an OSA 100 comprises an interposer 101 having first and second opposing sides 101a, 101b, and defining an alignment aperture 103 extending from the first opposing side to the second opposing side. The OSA 101 also comprises a fiber 104 disposed in the alignment aperture. The fiber has a first optical axis 107. The OSA 101 also comprises a light-emitting component 106, which is mounted to the second opposing side, and which has a second optical axis 108 coincident with the first optical axis 107. Referring back to FIG. 2, the light-emitting component is configured to emit light, at least a portion of which is coupled to fiber 210 to which the optical component is coupled.

These elements are described in greater detail and with respect to selected alternative embodiments.

An important element of the light source of this disclosure is the OSA 101, and, in particular, the interposer 101 as shown in FIG. 1. The interposer functions as a substrate for optical, opto-electrical, and/or electrical components and provides interconnections to optically and/or electrically interconnect the optical/opto-electrical/electrical components. Details of suitable configurations of OSAs/interposers for use in the embodiments disclosed herein are disclosed in co-pending U.S. application Ser. No. 16/450,189, filed Jun. 24, 2019, which is hereby incorporated by reference in its entirety. Accordingly, not all details of various embodiments of suitable OSA/interposer are disclosed herein.

The interposer should be rigid to support the optical and electrical components, and capable of being readily machined or etched. In one embodiment, the interposer comprises an insulating material to isolate electrical traces and contacts disposed thereon. In one embodiment, the interposer comprises a ceramic or glass. Alternatively, the interposer may comprise a semiconductor such as silicon. In one embodiment, the interposer comprises a material having essentially the same coefficient of expansion (COE) as the optical component and chip disposed thereon. (Silicon and ceramic have similar COEs.) By matching the COE of the interposer to the components mounted thereon, the OSA is mechanically stable over a wide temperature range. This is particularly beneficial in applications in which sterilizing the OSA may be required such as in medical applications.

Although the first and second opposing sides are parallel in the embodiments illustrated herein, in other embodiments, the first and second opposing sides may be non-parallel.

In one embodiment, the alignment aperture 103 receives the fiber and holds the fiber such that the first optical axis 107 is positioned essentially perpendicular to the first and second opposing sides. As used herein, the term essentially orthogonal/perpendicular means about 90°, not precisely 90° but for example 90°+/−5° or so. In one embodiment, the aperture is configured to hold the fiber in a precise position relative to the interposer, thereby facilitating passive alignment of the fiber with respect to the optical component. Passive alignment is generally preferred as it facilitates manufacturability (as opposed active alignment which requires energizing the optical components and then aligning optical components to optimize optical coupling).

The alignment aperture may have different embodiments. For example, in one embodiment, the alignment aperture is a borehole as shown in FIG. 1. In an alternative embodiment, the alignment aperture may be defined as a V-groove interposer. (V-grooves are well-known for providing precise alignment for optical elements having a round cross-section such as an optical fiber.)

In one embodiment, the alignment aperture is configured as a ferrule receiver or as a receptacle to receive a plug containing the fiber. In one embodiment, the first opposing side of the interposer may comprise a structure for inter-engaging mechanically with the plug. Such a configuration may involve a ferrule receiver such as that shown in FIG. 1 of in U.S. application Ser. No. 16/450,189. Alternatively, the aperture may be configured to receive a ferrule containing a fiber. Those of skill in the art will appreciate other suitable alignment aperture configurations in light of this disclosure.

The light-emitting component may be any known or later-developed component that can be optically coupled to an optical fiber. Suitable light-emitting components include, for example, a laser—such as a vertical cavity surface emitting laser (VCSEL), double channel, planar buried heterostructure (DC-PBH), buried crescent (BC), distributed feedback (DFB), or distributed Bragg reflector (DBR)—or a light-emitting diode (LEDs)—such as a surface emitting LED (SLED), edge emitting LED (ELED), or super luminescent diode (SLD). It should also be understood that the optical component may be a single discrete device, or it may be assembled or integrated as an array of devices. In one embodiment, the optical component is a surface emitting light source such as a VCSEL or LED. Such surface emitting light sources may be preferred in certain embodiments because their optical axis is perpendicular to their mounting plane such that they can be mounted parallel to the interposer with their optical axis aligned with the optical axis of the fiber.

In one embodiment, the optical component works in conjunction with one or more electronic chips. A chip as used herein refers to any electronic/semiconductor chip needed to facilitate the function of the optical component. For example, if the optical component is a transmitter, then the chip may be a driver, or, if the optical component is a receiver, then the chip may be a transimpedance amplifier (TIA). The required chip for a given optical component is well known in the art will not be described here in detail.

In one embodiment, the chip is mounted on either the first or second opposing side, and, in a more particular embodiment, the chip 109 is mounted on the second opposing side 101*b* as shown in FIG. 1. In such embodiments, rather than disposing the chip on the circuit board and electrically connecting the chip with the optical component on the interposer as is done conventionally, here, in one embodiment, the transmitter/receiver chip is disposed on the interposer in close proximity to the optical component, and, thus, the traces between the chip and the optical component are very short which facilitates high speed operation by reducing impedance. However, in applications such as a light source, where the light-emitting component is operated continuously and not modulated to transmit data, low impedance is not critical. Therefore, in one embodiment, it may be preferable to locate the chip on the circuit board rather than on the interposer. Those of skill in the art will be able to optimize the placement of the chip in light of this disclosure.

In one embodiment, a feedback component is used to provide feedback for the light-emitting component. Such feedback loops for lasers are well-known. However, feedback loops for LEDs are less common. Nevertheless, because both LED and lasers tend to vary in light output over a temperature range and over the component's lifetime, the need for feedback is critical to maintain constant output for the optical sensors. The feedback component can be any optical component for receiving light and quantifying it. For example, a suitable feedback component includes a photodiode, such as P Intrinsic N (PIN) or avalanche photodiode (APD).

Figure 3:
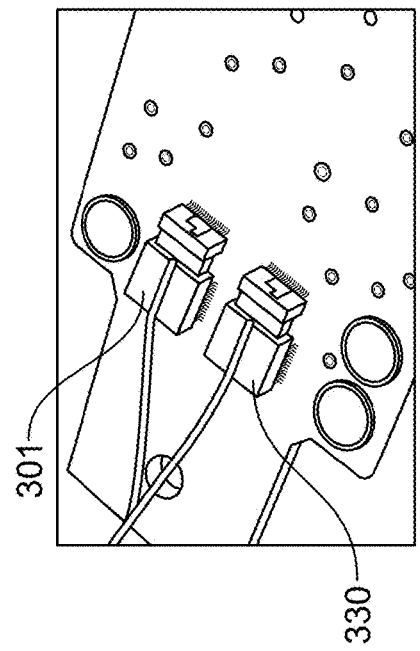
FIG. 3 is an image of one embodiment of the transmitting optical subassembly (TOSA) and receiving optical subassembly (ROSA) used in the light source.

In one embodiment, the feedback component 230 is incorporated into its own OSA as shown in FIG. 2. For example, in one embodiment, the receiving OSA (ROSA) may be similar to the transmitting OSA (TOSA) described herein except the optical component is a receiver rather than a transmitter. Thus, it should be understood that any disclosure with respect to the TOSA herein may also apply to the ROSA. Referring to FIG. 3, an image of one embodiment of the transmitting optical subassembly (TOSA) 301 and receiving optical subassembly (ROSA) 330 used in the light source. In this embodiment, some sort of splitter/reflector 240 is used to return a portion of the coupled light to the feedback component 230.

Alternatively, rather than the feedback component being in a discrete ROSA, the feedback component may be combined with the OSA of the light-emitting component. One embodiment of such is disclosed, for example, in U.S. patent application Ser. No. 16/450,189.

Alternatively, rather than reflecting a portion of the coupled light back to the feedback component, the feedback component may be optically coupled directly to the light-transmitting component. Such an embodiment is disclosed in U.S. patent application Ser. No. 17/133,235, filed Dec. 23, 2020, herein incorporated by reference. For example, referring to FIG. 6, an optical subassembly 600 is shown comprising an interposer 601 with both light-transmitting and light-receiving (feedback) optical components 661, 662, respectively, mounted directly on the interposer. In this embodiment, the feedback optical component 662 is disposed sufficiently close to the interface of the light-transmitting optical component 661 and the fiber to pick up backscattering from the interface. Applicant has found surprisingly that backscattered light from the fiber is sufficient to provide feedback of the output of the light-transmitting optical component 661. In this particular embodiment, the light-transmitting component is a VCSEL and the light-receiving component is a photo diode. Still other embodiments will be obvious to those of skill in the art in light of this disclosure. In this embodiment, there is no need for a splitter/reflector 240 to return a portion of the coupled light to the feedback component.

Referring to back to FIG. 1, in one embodiment, the fiber 104 is directly coupled optically with the component 106. As used herein, direct coupling means no light bending between the optical axis of the fiber and the optical axis of the optical component. Accordingly, in a direct coupling, there are no intervening optics/reflective/refractive surfaces to change the direction of light propagation between the optical axis of the fiber and the optical axis of the optical component. In other words, unlike many conventional OSAs, the OSA of the present invention does not have reflective surfaces between the fiber and the optical component. Such an embodiment simplifies manufacturing and provides a more robust/high integrity optical path between the optical component and the fiber.

The direct coupling between the fiber in the optical component may have different embodiments. For example, in one embodiment, the optical fiber is butt coupled to the optical component. In one embodiment, the butt coupled interface involves physically contacting the end face of the optical fiber with the optical component. Such physical contact provides a high integrity/low loss optical coupling.

Alternatively, in another embodiment, no physical contact is made between the fiber end face and the optical component, thereby defining an airgap therebetween, as shown, for example, in FIG. 1. In such an embodiment, it may be beneficial to use an antireflective coating to reduce Fresnel losses. In yet another embodiment, it may be beneficial to use an expanded beam coupling between the fiber and the optical component. For example, in one embodiment, a gradient-index (GRIN) lens is disposed between the fiber end face and the optical component. Alternately, a converging lens may be formed on the fiber end face or otherwise disposed near the end face for focusing light. Still other embodiments will be known to those of skill in the art in light of this disclosure.

In one embodiment, the fiber 104 of FIG. 1 is the same fiber as fiber 210/211 of FIG. 2. In another embodiment, fiber 104 is discrete from fiber 210/21. For example, fiber 104 may be a fiber stub or pig tail that is optically coupled to fiber 210/211 through know configurations such as, for example, a fusion splice, a physical contact splice, or a connectorized coupling.

Referring back to FIG. 2, in one embodiment, the optical source 200 comprises a splitter 240 for providing a portion of the emitted light to a feedback component 230 to regulate the light-emitting component as mentioned above. The splitter 240 can be configured in different ways. For example, in one embodiment, the splitter comprises a reflect/pass splitter in which a small portion of the light is reflected back to the feedback component 230. The portion of reflected light can vary, although, in one embodiment, a 5%/95% reflect/pass splitter is used in which 5% of the output of the light-emitting component is reflected back to the feedback component 230.

Figure 6:
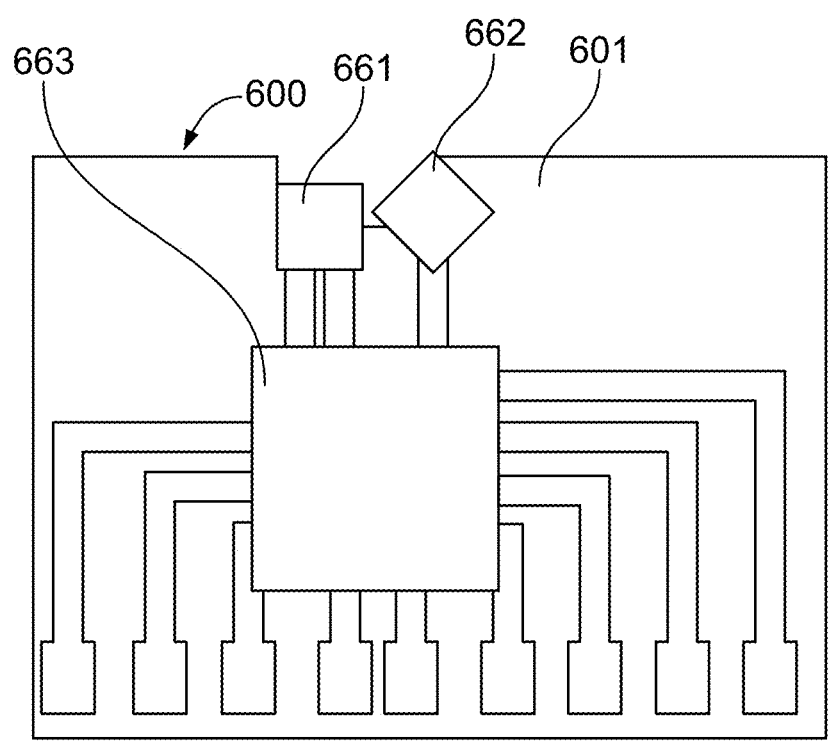
FIG. 6 shows another embodiment of an optical subassembly in which the interposer comprises both transmit and receive (feedback) optical components.

In one embodiment, if an OSA is used that does not require reflecting a portion of the coupled light back to the OSA (see, for example, the embodiment of FIG. 6), then the feedback circuit of FIG. 2 can be simplified significantly. For example, if the OSA 600 of FIG. 6 is used in which the feedback is obtained directly from the light-transmitting optical component (and not by virtue of reflecting coupled light in the fiber back to a feedback device), then the splitter 240 of FIG. 2 can be eliminated and elements 201, 210, and 230 of the optical source 200 can be combined. Again, eliminating/combining components not only reduces costs, space, and weight, but also reduces optical losses.

In one embodiment, the splitter 240 is not a discrete component for providing feedback, but rather is a leg on a multileg splitter for supplying light to a plurality of sensors. For example, if a 1:4 splitter is used, three of the output legs could supply three different optical sensors, and the fourth output leg could provide feedback. The advantage of this embodiment is the elimination of a discrete splitter for feedback purposes. Eliminating components not only reduces costs, space, and weight, but also reduces optical losses.

Figure 4:
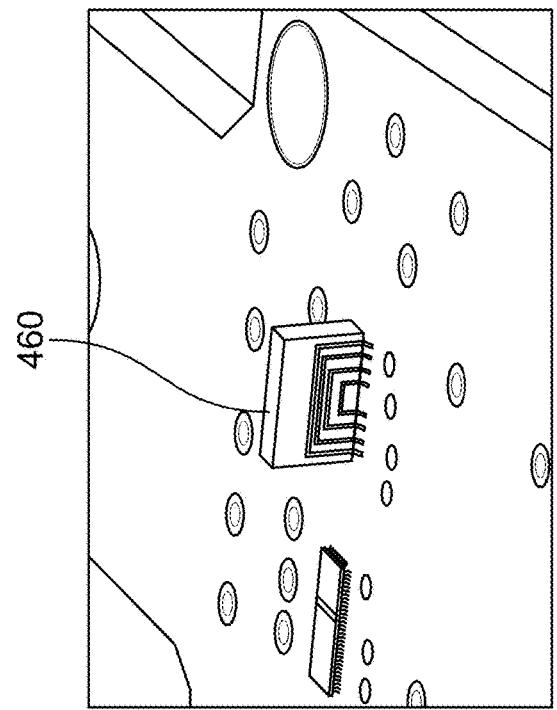
FIG. 4 is an image of one embodiment of a sensor signal receiving subassembly used to measure the output of an optical sensor.

The optical sensor may be any known optical sensors. A typical sensor comprises a transmitting sensor component and a receiving sensor component. The transmitting component transits an optical signal to generate a sensor signal of the property being measured. The receiving component receives the sensor signal and converts in into a representative electrical signal. Such sensor signal receiving components are well known, and, include, for example, photodiodes as described above. In one embodiment, the sensor signal receiving component is configured within an OSA as described above. Referring to FIG. 4, an image of one embodiment of a sensor signal receiving subassembly 460 is shown. Alternatively, the OSA for the sensor receiving component may be an off-the-shelf component as optical coupling to photodiodes tends to be relatively simple given the wide spot size a photodiode tends to accommodate—i.e. alignment and small spot sizes are not critical.

In one embodiment, a splitter 241 (e.g. a 50-50 splitter) is used to direct the output signal of the optical sensor 250. More specifically, the splitter 241 is configured to receive the sensor signal from the optical sensor 250 and split the sensor signal on fibers 211 and 212. It should be noted that fiber 211 also supplies light from the splitter 241 to the optical sensor 250. Thus, fiber 211 both supplies light to the optical sensor 250 and receives a portion of the sensor signal from optical sensor 250. The portion of the sensor signal that is outputted on fiber 211 is essentially ignored as it propagates back into the light source where it is lost. However, the other portion of the sensor signal outputted on fiber 212 is received by a sensor signal receiving component 260 which is configured to measure the sensor signal.

Thus, in operation, the light source 200 functions as follows. Light is emitted from OSA 201 and is coupled to fiber 210. A portion of the light is reflected back to a feedback control component 230 by splitter 240. The remaining light is coupled to fiber 211. Light from fiber 211 passes through the splitter 241 and is coupled to the optical sensor 250 by fiber 213. A sensor signal from optical sensor 250 is coupled to fiber 213 which is coupled to the splitter 241. The splitter 241 splits the sensor signal and couples a portion of the sensor signal to fiber 211 where it is lost, and couples another portion of the sensor signal to fiber 212, which is coupled to the sensor signal receiving component 260, which is configured to measure the sensor signal.

Figure 5:
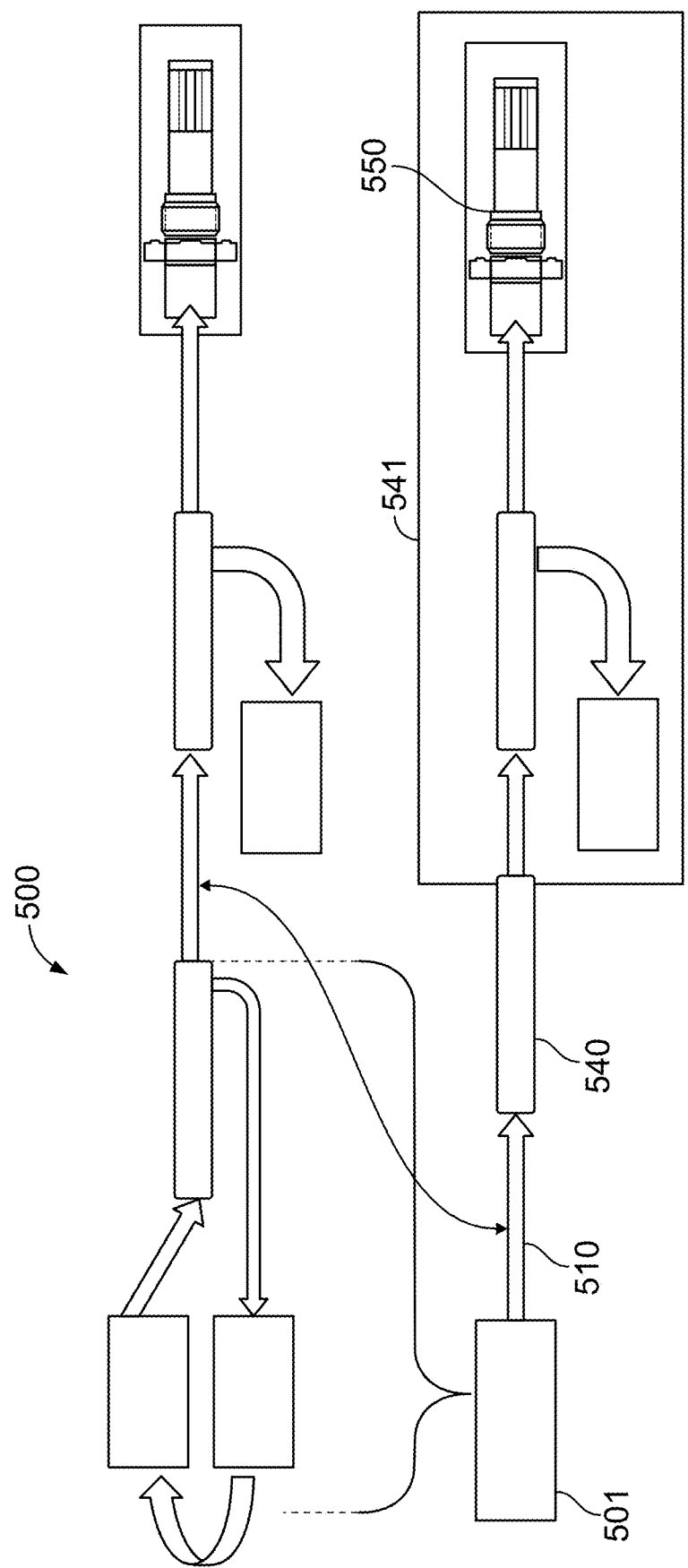
FIG. 5 is an alternative embodiment of a light source for supplying a plurality of optical sensors.

In one embodiment, the light source of the present invention is used to supply a plurality of optical sensors. For example, referring to FIG. 5, one embodiment of a light source 500 for supplying multiple sensors is shown. In this particular embodiment, light-emitting component is an LED in OSA 501. As in the embodiment of FIG. 2, emitted light from OSA 501 is coupled to the fiber 510, but, in this embodiment, there is a 1:x splitter 540 supplying a plurality of optical sensors. X is an integer greater than one—e.g. 2, 3, 4, 8, etc. For example, in one embodiment, the 1:x splitter is a 1:4 splitter. For simplicity, just one of the four legs supplying an optical sensor 550 is illustrated in box 541. It should be noted that the configuration of this leg is essentially the same as the single leg disclosed in the embodiment of FIG. 2.

In yet another embodiment, rather than using a splitter to supply a plurality of optical signals, wavelength multiplexing is used. More specifically, in one embodiment, the light-emitting component comprises a pump light source for emitting a pump light having a first wavelength, and one or more wavelength-converting materials for converting a portion of the pump light to converted light having one or more second wavelengths, each different from the first wavelength, such that the emitted light comprises the pump light having the first wavelength and the converted light having the one or more second wavelengths. In this embodiment, the splitter is a wavelength filter configured to separate the light based on wavelength. Such wavelength filters are known, and include, for example, wafer scale gratings.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An optical sensor system for measuring a property of a target matter, said system comprising:
   a light source comprising at least,
   an interposer having first and second opposing sides and defining at least one alignment aperture extending from said first opposing side to said second opposing side;
   at least one fiber disposed in said at least one alignment aperture, said at least one fiber having a first optical axis;
   at least one light generating component mounted to said second opposing side and having a second optical axis coincident with said first optical axis, said light generating component configured to emit light, at least a portion of which is coupled with said at least one fiber as coupled light,
   a feedback component configured to provide feedback to said at least one light generating component such that said at least one light generating component maintains constant optical power; and
   at least one optical sensor optically coupled to said at least one fiber and configured to direct at least a portion of said coupled light at a target matter and transmit a sensor signal back on said at least one fiber, and
   at least one optical sensor receiving component configured to receive at least a portion of said sensor signal to measure a property of said target matter.

2. The optical sensor system of claim 1, wherein said at least one optical sensor comprises a transmitting sensor component.

3. The optical sensor system of claim 2, further comprising:
   a splitter optically coupled to said transmitting sensor component and having at least a first leg coupled to said receiving sensor component, and a second leg coupled to said at least one fiber.

4. The optical sensor system of claim 3, wherein said splitter is a 50-50 splitter.

5. The optical sensor system of claim 1, wherein said at least one optical sensor comprises a plurality of optical sensors.

6. The optical sensor system of claim 5, further comprising:
   at least one splitter optically coupled to said at least one fiber, and having a plurality of legs, wherein each of said a plurality of optical sensors is optically coupled to one of said plurality of legs.

7. The optical sensor system of claim 1, wherein said feedback component is integrated with the light generating component.

8. The optical sensor system of claim 1, wherein said feedback device comprises at least a pass/reflect filter.

9. The optical sensor system of claim 7, wherein said at least one optical sensor comprises a plurality of optical sensors, and wherein said at least one splitter comprises a plurality of legs, and wherein each of said a plurality of optical sensors is optically coupled to one of said plurality of legs.

10. The optical sensor system of claim 1, wherein said light generating component comprises at least one light emitting diode (LED).

11. The optical sensor system of claim 1, wherein said light generating component emits light at different wavelengths.

12. The optical sensor system of claim 11, wherein said light generating component comprises at least one light emitting diode (LED), wherein said at least one LED comprises at least one diode configured for emitting pump light having a first wavelength, and one or more wavelength-converting materials for converting a portion of said pump light to converted light having one or more second wavelengths, each of said second wavelengths being different from said first wavelength, such that said emitted light comprises a combination of said pump light and said converted light.

13. The optical sensor system of claim 12, wherein said at least one LED comprises a plurality of LEDs each having a different wavelength.

14. The optical sensor system of claim 11, further comprising a wavelength filter to split said coupled light into two or more light supplies for different sensors, each of said light supplies having a different wavelength.

15. The optical sensor system of claim 1, wherein said feedback component is disposed on said interposer to receive at least a portion of uncoupled light emitted from an interface between said optical component and said fiber, said feedback component configured to monitor output of said optical component.

16. A light source for at least one optical sensor in combination with a optical sensor transmitting component and an optical sensor receiving component to measure a property of a target matter, said light source comprising at least,
   an interposer having first and second opposing sides and defining at least one alignment aperture extending from said first opposing side to said second opposing side;
   at least one fiber disposed in said at least one alignment aperture, said at least one fiber having a first optical axis, said least one fiber being configured to optically couple to said optical sensor transmitting component to supply said optical sensor transmitting component with at least a portion of coupled light and receive from said optical sensor transmitting component a sensor signal;
   at least one light generating component mounted to said second opposing side and having a second optical axis coincident with said first optical axis, said light generating component configured to emit light, at least a portion of which is coupled with said at least one fiber as said coupled light; and
   a feedback component configured to provide feedback to said at least one light generating component such that said at least one light generating component maintains constant optical power.

17. The light source of claim 16, wherein said light generating component comprises at least one light emitting diode (LED).

18. The light source of claim 16, wherein said at least one optical sensor comprises a plurality of optical sensors, and wherein said at least one splitter comprises a plurality of legs, and wherein each of said a plurality of optical sensors is optically coupled to one of said plurality of legs.

19. The light source of claim 16, wherein said at least one optical sensor comprises a plurality of optical sensors, and further comprising at least one second splitter comprising a plurality of legs, and wherein each of said a plurality of optical sensors is optically coupled to one of said plurality of legs.

20. The light source of claim 16, wherein said feedback component is disposed on said interposer to receive at least a portion of uncoupled light emitted from an interface between said optical component and said fiber, said feedback component configured to monitor output of said optical component.

* * * * *